United States Patent
Koskinen et al.

(10) Patent No.: US 12,490,236 B2
(45) Date of Patent: Dec. 2, 2025

(54) PAGING RESPONSE ON PRE-CONFIGURED RESOURCES

(71) Applicant: Nokia Technologies Oy, Espoo (FI)

(72) Inventors: Jussi-Pekka Koskinen, Oulu (FI); Samuli Heikki Turtinen, Ii (FI); Daniela Laselva, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 395 days.

(21) Appl. No.: 18/040,950

(22) PCT Filed: Jun. 28, 2021

(86) PCT No.: PCT/EP2021/067681
§ 371 (c)(1),
(2) Date: Feb. 7, 2023

(87) PCT Pub. No.: WO2022/037830
PCT Pub. Date: Feb. 24, 2022

(65) Prior Publication Data
US 2023/0319781 A1  Oct. 5, 2023

(30) Foreign Application Priority Data
Aug. 21, 2020  (EP) .................................... 20192213

(51) Int. Cl.
*H04W 68/02*  (2009.01)
*H04W 74/0833*  (2024.01)

(52) U.S. Cl.
CPC ....... *H04W 68/02* (2013.01); *H04W 74/0833* (2013.01)

(58) Field of Classification Search
CPC . H04W 68/02; H04W 68/00; H04W 74/0833; H04W 74/004
See application file for complete search history.

(56) References Cited

U.S. PATENT DOCUMENTS

2013/0343362 A1\* 12/2013 Huang .................... H04W 4/70
370/336
2015/0296481 A1  10/2015 Yu et al.
(Continued)

FOREIGN PATENT DOCUMENTS

WO  2020/030741 A1  2/2020
WO  2020/032659 A1  2/2020
(Continued)

OTHER PUBLICATIONS

Office action received for corresponding European Patent Application No. 20192213.5, dated Mar. 18, 2024, 5 pages.
(Continued)

*Primary Examiner* — Dinh Nguyen
(74) *Attorney, Agent, or Firm* — Carter, DeLuca & Farrell LLP

(57) ABSTRACT

Inter-alia, a method is disclosed comprising: receiving a paging information from a mobile communication network; based on the received paging information, determining whether at least one pre-configured resource of a mobile communication network is to be utilized for responding to the paging information; and based on the determining, initiating at least one transmission via at least one of a random access procedure or on the at least one pre-configured resource. It is further disclosed an according apparatus, a computer program and a system.

1 Claim, 7 Drawing Sheets

(56) References Cited

U.S. PATENT DOCUMENTS

| | | | |
|---|---|---|---|
| 2018/0376422 A1 | 12/2018 | Shu et al. | |
| 2021/0168894 A1* | 6/2021 | Sha | H04W 76/28 |
| 2023/0020533 A1* | 1/2023 | Wang | H04W 12/04 |

FOREIGN PATENT DOCUMENTS

| | | |
|---|---|---|
| WO | 2020/056594 A1 | 3/2020 |
| WO | 2020/093316 A1 | 5/2020 |
| WO | 2020/193846 A1 | 10/2020 |

OTHER PUBLICATIONS

"Work Item on NR smalldata transmissions in Inactive state", 3GPP TSG RAN Meeting #86, RP-193252, Agenda: 9.1.2, ZTE Corporation, Dec. 9-12, 2019, 4 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.1.0, Mar. 2020, pp. 1-386.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.0.0, Mar. 2020, pp. 1-1048.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"Agreed CRs to TS 25.435", TSG-RAN Meeting #9, RP-000391, Agenda: 5.3.3, TSG-RAN WG3, Sep. 20-22, 2000, 30 pages.

Extended European Search Report received for corresponding European Patent Application No. 20192213.5, dated Jan. 29, 2021, 10 pages.

"DL data transmission in RRC Inactive", 3GPP TSG-RAN WG2 #98, R2-1704894, Agenda: 1 0.4.1 .6, Huawei, May 15-19, 2017, pp. 1-4.

International Search Report and Written Opinion received for corresponding Patent Cooperation Treaty Application No. PCT/EP2021/067681, dated Aug. 12, 2021, 15 pages.

Notice of Allowance received for corresponding European Patent Application No. 20192213.5, dated Feb. 6, 2025, 7 pages.

* cited by examiner

PAGING RESPONSE ON PRE-CONFIGURED RESOURCES

RELATED APPLICATION

This application was originally filed as PCT Application No. PCT/EP2021/067681, filed on Jun. 28, 2021, which claims priority from EP Application Serial No. 20192213.5, filed on Aug. 21, 2020, each of which is incorporated herein by reference in its entirety.

FIELD

The following disclosure relates to the field of mobile communication networks, or more particularly relates to systems, apparatuses, and methods for pre-configured grant for mobile terminated access to a resource of a mobile communication network.

BACKGROUND

Transmission of uplink data can be introduced in INACTIVE states of mobile device (e.g. a UE (User Equipment)) on pre-configured resources, e.g. PUSCH (Physical Uplink Shared Channel) resources. Such resources can be configured for the mobile device using dedicated or broadcast signaling. In E-UTRAN (evolved UMTS Terrestrial Radio Access Network) i.e. NB-IoT (Narrow Band-Internet-of-Things) and MTC (Machine Type Communication) PUR (Preconfigured Uplink Resources), respective resources are configured for the mobile device using dedicated signaling, e.g. via RRC (Radio Resource Control Protocol) Connection Release messages. Paging information are sent to UEs, based on which a respective UE can respond the paging with an appropriate procedure. For instance, to establish a link for a transmission of data, the corresponding response to the paging is sent by the UE.

SUMMARY OF SOME EXEMPLARY EMBODIMENTS

However, it is a drawback that responding to the paging or paging information via regular means requires complex signaling. This is power consuming for the UE, e.g. and increases latency, since the signaling has to be done.

It is thus, inter alia, an object of embodiments disclosed to reduce or avoid at least some of the aforementioned drawbacks, e.g. decreasing latency of responding a paging information, and to decrease power consumption at the mobile device.

According to a first exemplary aspect, a method is disclosed, the method comprising:
  receiving a paging information from a mobile communication network;
  based on the received paging information, determining whether at least one pre-configured resource of a mobile communication network is to be utilized for responding to the paging information; and
  based on the determining, initiating at least one transmission via at least one of a random access procedure or on the at least one pre-configured resource.

This method may for instance be performed and/or controlled by an apparatus, for instance a mobile device, e.g. a mobile terminal, UE, smartphone, tablet, IoT-device, wearable, or a combination thereof, to name but a few non-limiting examples. For instance, the method may be performed and/or controlled by using at least one processor of the mobile device.

According to a second exemplary aspect, a method is disclosed, the method comprising:
  providing paging information at least indicative of at least one pre-configured resource of a mobile communication network is to be utilized for responding to the paging information;
  responsive to the provided paging information, obtaining at least one transmission via at least one of a random access procedure or on the at least one pre-configured resource.

This method may for instance be performed and/or controlled by an apparatus, for instance a base station (e.g. a gNB, an eNB (evolved NodeB), a new-generation (ng-) eNB) of the mobile communication network, and/or a server providing one or more services. Alternatively, this method may be performed and/or controlled by more than one apparatus, for instance various entities of the mobile communication network comprising a plurality (e.g. at least two) of such base stations, and/or a server cloud comprising at least two servers. For instance, the method may be performed and/or controlled by using at least one processor of the base station and/or server.

According to a third exemplary aspect, a method is disclosed, the method comprising:
  providing, by at least one second apparatus, paging information at least indicative of at least one pre-configured resource of a mobile communication network is to be utilized for responding to the paging information;
  receiving, by at least one first apparatus, a paging information from a mobile communication network;
  based on the received paging information, determining, by at least one first apparatus, whether at least one pre-configured resource of a mobile communication network is to be utilized for responding to the paging information; and
  based on the determining, initiating, by at least one first apparatus, at least one transmission via at least one of a random access procedure or on the at least one pre-configured resource.
  responsive to the provided paging information, obtaining, by at least one second apparatus, at least one transmission via at least one of a random access procedure or on the at least one pre-configured resource.

This method may for instance be performed and/or controlled by a first apparatus and a second apparatus, for instance the apparatus as disclosed above according to the first exemplary aspect and the apparatus as disclosed above according to the second exemplary aspect.

The method according to the first, second and/or third exemplary aspect may allow Random Access resources to be saved, latency to be decreased, and power consumption of the respective mobile devices also to be decreased, since it may be avoided that the respective mobile device has to resume the connection using a dedicated signaling before receiving the data (e.g. downlink data). In addition, pre-configured resources (e.g. PUSCH resources) may be utilizable in a more efficient way.

According to a further exemplary aspect, a computer program is disclosed, the computer program when executed by a processor causing an apparatus, for instance a respective mobile device, base stations, and/or server, to perform and/or control the actions of the method according to the first, second or third exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect, an apparatus is disclosed, configured to perform and/or control or comprising respective means for performing and/or controlling the method according to the first, second or third exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect, an apparatus is disclosed, comprising at least one processor and at least one memory including computer program code, the at least one memory and the computer program code configured to, with the at least one processor, cause an apparatus, for instance the apparatus, at least to perform and/or to control the method according to the first, second or third exemplary aspect.

The above-disclosed apparatus according to any aspect may be a module or a component for a device, for example a chip. Alternatively, the disclosed apparatus according to any aspect may be a device, for instance a server or server cloud. The disclosed apparatus according to any aspect may comprise only the disclosed components, for instance means, processor, memory, or may further comprise one or more additional components.

According to a further exemplary aspect, a system is disclosed, comprising:
at least one first apparatus according to the first exemplary aspect as disclosed above, and at least one second apparatus according to the second exemplary aspect as disclosed above.

In an example embodiment, the at least one first apparatus according to the first exemplary aspect and the at least one second apparatus according to the second exemplary aspect are configured to perform and/or control the method according to the third exemplary aspect at least partially jointly, or together.

In the following, exemplary features and exemplary embodiments of all aspects will be described in further detail.

The mobile communication network may for instance be cellular network. The mobile communication network may for example be a mobile phone network like a 2G/3G/4G/5G/New Radio (NR) and/or future cellular communication network. The 2G/3G/4G/5G/NR cellular radio communication standards are developed by the 3GPP and presently available under http://www.3gpp.org/.

A mobile communication network, as used herein, refers to a network that can be utilized by one or more mobile devices. Such a mobile communication network typically operates in accordance with a given standard or specification which may set out what the various entities (e.g. the one or more mobile devices, one or more base stations (e.g. gNBs (NodeB)) associated with the system are permitted to do and how that should be achieved. Communication protocols and/or parameters which shall be used for the connection are also typically defined. Examples of standardized radio access technologies comprise GSM (Global System for Mobile), EDGE (Enhanced Data for GSM Evolution) Radio Access Networks (GERAN), Universal Terrestrial Radio Access Networks (UTRAN) and evolved UTRAN (E-UTRAN), to name but a few non-limiting examples. An example of standardized communication system architecture is Long-term Evolution (LTE) of the Universal Mobile Telecommunications Systems (UMTS) Radio Access Technology. LTE is standardized by the 3rd Generation Partnership Project (3GPP). The LTE employs E-UTRAN access. Further developments are referred to as LTE Advanced (LTE-A), fifth generation (5G), or 5G+, and/or New Radio (NR) communication standard.

Such an apparatus (e.g. a mobile device) according to the first exemplary aspect, as used herein, may for instance be portable (e.g. weigh less than 1, 0.8, 0.6, 0.4, 0.2, 0.1 kg, or less), like a mobile phone, personal digital assistance device, computer, laptop computer, or a UE (User Equipment), as non-limiting examples. The apparatus may for instance comprise or be connectable to a display for displaying information. The apparatus may for instance comprise or be connectable to means for outputting sound, e.g. in the form of spoken commands or information. The apparatus may for instance comprise or be connectable to one or more sensors for determining the devices position, such as for instance a GNSS receiver, in the form of a GPS receiver. The apparatus may for instance comprise or be connectable to one or more sensors, e.g. in the form of an accelerometer and/or a gyroscope and/or magnetometer and/or barometer for gathering (e.g. measuring) further information, such as motion sensor data. The apparatus may for instance comprise or be connectable to a receiver and/or a transmitter (e.g. a transceiver) for receiving and/or sending information.

According to an exemplary embodiment of the first exemplary aspect, the method further comprises:
obtaining paging information; and
checking the paging information for whether or not the paging information indicates information for the apparatus.

The paging information may for instance be a paging message. The paging information may be obtained, e.g. by receiving the paging information, e.g. from at least a base station of the mobile communication network. The paging information may be provided by such a base station via a broadcast signaling, and/or via a dedicated/common signaling to the apparatus (e.g. mobile device). The paging information may for instance be indicative of how the paging information can be responded, e.g. initiating at least one transmission on the at least one pre-configured resource, to name but one non-limiting example. The apparatus (e.g. UE) may send a paging response, thus responding to the paging information. The apparatus may respond to the paging information by initiating at least one transmission, using either a random access procedure or on the at least one pre-configured resource. How to respond to the paging information may be determined based on the paging information. It may be determined whether at least one pre-configured resource is to be utilized for responding to the paging information. Such a paging response to the paging information may be a connection establishment, e.g. of a connection between the apparatus (e.g. UE) and the respective base station. For responding to the paging information, the apparatus may transmit primarily uplink signaling data representing the paging response, e.g. on the at least one pre-configured resource.

To enable the apparatus to obtain (e.g. receive) the paging information, the apparatus may be needed to wake up, since it may be or be set into a power saving state or mode, such as an INACTIVE state as enabled according to a certain (e.g. NR) communication standard. For instance, the apparatus may be or be set into a so-called RRC_INACTIVE state. More details with regard to such an INACTIVE state are disclosed below. Such a power saving state or mode or an INACTIVE state may for instance make use of a DRX (Discontinuous Reception) state or mode. According to e.g. pre-defined or determined time intervals, the apparatus may e.g. wake up, e.g. by turning on the power of a receiver and/or transceiver comprised by or connectable to the apparatus. By turning the receiver and/or transceiver on, the apparatus is enabled to listen e.g. to a transmission channel, e.g. a PDCCH (Physical Downlink Control Channel), and/or a PDSCH (Physical Downlink Shared Channel). For instance, paging indication and paging information may be sent by at least one base station of the mobile communication network via such transmission channels, respectively.

According to an exemplary embodiment of all exemplary aspects, the at least one transmission is at least one of a Physical, PHY, message, Medium Access Control, MAC, message, or a Radio Resource Control, RRC, message. For instance, the paging information (e.g. paging message) may include an indication that pre-configured PUSCH resource(s) shall be used for the subsequent uplink transmission used for responding to paging, e.g. initiating the at least one transmission. The at least one (e.g. uplink) transmission can be e.g. a PHY/MAC/RRC message. The RRC message can be e.g. an RRC Setup Request, or RRC Resume Request, or a new RRC message for a transmission using a pre-configured PUSCH resource According to an exemplary embodiment of all exemplary aspects, the at least one pre-configured resource is a Physical Uplink Shared Channel, PUSCH, resource.

The pre-configured resource, as used herein, may be understood as a resource part of a pre-configured set of resources. For instance, the preconfigured resource may be a pre-configured PUSCH resources, which may be a part or is a Physical Resource Blocks (PRBs or RBs). This may be a frequency range in a PUSCH resource grid that can be used at the time the paging information has to be responded, thus, the paging response has to be sent (e.g. a certain period after the paging information is obtained (e.g. received)).

According to an exemplary embodiment of the first exemplary aspect, the determining whether at least one pre-configured resource of a mobile communication network is to be utilized for responding to the paging information is based, at least in part, on at least one of whether the apparatus has a valid timing advance, whether the apparatus has at least one valid pre-configured resource, or whether the apparatus has receivedan indication that the at least one pre-configured resource is to be utilized for responding to the paging information.

For instance, the apparatus according to the first exemplary aspect (e.g. UE) may determine whether to respond the paging information via pre-configured PUSCH resource(s) or via a random access procedure. Such a determining may be e.g. based on whether the apparatus (e.g. UE) has a valid timing advance, whether the UE has valid pre-configured PUSCH resources, and whether the UE has received an indication to use pre-configured PUSCH resources.

For instance, the apparatus may have determined that a random access procedure can be avoided, e.g. by the determining. Then, the initiating of the at least one transmission, e.g. as a response to the paging information may be sent on or from the at least one pre-configured resource. As disclosed above, the initiating of the at least one transmission may enable a connection establishment taking place between the apparatus and the respective base station of the mobile communication network. The at least one pre-configured resource of the mobile communication network may be usable for responding to the paging information, e.g. sending the corresponding uplink signaling data on the at least one pre-configured resource. For instance, the paging information indicates or represents that the apparatus can use or utilize the at least one pre-configured resource (e.g. the paging information indicates that the mobile communication network allows this).

Then, the apparatus may respond to the paging information by starting or initiating the at least one transmission, e.g. via a random access procedure, or on the at least one pre-configured resource. In case of the random access procedure, the paging information is e.g. not responded e.g. with a paging response message sent on the at least one pre-configured resource, but e.g. by sending the random access preamble to initiate the at least one transmission.

The response to the paging information may be further indicative of whether an uplink and/or downlink transmission of data is intended to be performed by the apparatus via the at least one resource. For instance, the response may thus further be indicative of whether UL/DL data can be sent by the mobile device using one or more preconfigured resources. So the paging may further be utilized as an activation/deactivation for the preconfigured resource(s).

According to an exemplary embodiment of all exemplary aspects, the indication that the at least one pre-configured resource is to be utilized for responding to the paging information is at least one of a SIB, System Information Block, message, a short message, a paging message, a RRC message, another dedicated message, or the indication is included in the paging information.

For instance, based on the received paging information, it is determined whether at least one pre-configured resource of the mobile communication network is to be utilized for responding to the paging information. For instance, the paging information may include an indication that the at least one pre-configured resource is to be utilized. Alternatively, such an indication may be obtained (e.g. received) by a SIB message, a short message, a RRC message or another dedicated message provided to the apparatus performing and/or controlling the method according to the first exemplary aspect.

Such a SIB message or a short message can indicate if the apparatus (e.g. mobile device) can or may use (or not use) the at least one resource (e.g. pre-configured PUSCH resource(s) for MT access), e.g. for responding the paging information (e.g. by sending a paging response message on the at least one pre-configured resource).

Such a SIB message, as used herein, may be enabled by the mobile communication network. One or more of such SIB message may be used to configure the apparatus according to the first exemplary aspect and/or the apparatus according to the second exemplary aspect to perform and/or control the respective method(s) according to the first, second and/or third exemplary aspects. Such a SIB message may be an additional message to the above disclosed paging information. Further, for configuring the apparatus according to the first and/or the apparatus according to the second exemplary aspect to perform and/or control the respective method(s) according to the first, second and/or third exemplary aspects, in addition or in the alternative a short message also enabled by the mobile communication network for communication between a respective mobile device and a respective base station may be used or utilized.

For instance, one or more system information, RRC Reconfiguration, RRC Release messages, or a combination thereof, may be used for configuring the apparatus according to the first exemplary aspect and/or the apparatus according to the second exemplary aspect to perform and/or control the respective method(s) according to the first, second and/or third exemplary aspect. For instance, this may enable provisioning of at least resource information, to name but one non-limiting example. The at least one pre-configured resource (or a plurality of resources) of the at least resource information may be different than regular resources that may be allocated to the apparatus in case the apparatus determines that a respective random access procedure shall be utilized.

According to an exemplary embodiment of the first exemplary aspect, the paging information comprises an indication to resume at least one suspended pre-configured resource for Mobile Terminated, MT, access.

For instance, the mobile communication network (e.g. an apparatus according to the second exemplary aspect; e.g. a base station) can configure the pre-configured (e.g. PUSCH) resource(s) for MT access, e.g., in the RRC Release message, such that they can only be used for MT access, i.e., upon indication from the mobile communication network, for instance, in the paging information (e.g. paging message).

According to an exemplary embodiment of the second exemplary aspect, the method further comprises:
providing an indication to resume at least one suspended pre-configured resource for Mobile Terminated, MT, access.

The indication may be provided, e.g. by sending the indication e.g. from a respective base station to the apparatus according to the first exemplary aspect. In an example embodiment, the indication may be comprised by the paging information (e.g. paging message).

According to an exemplary embodiment of all exemplary aspects, whether at least one pre-configured resource is to be utilized for responding to the paging information is determined further based on at least one identifier comprised by (e.g. within) the paging information, wherein if the identifier is a first (e.g. regular) identifier (e.g. of the apparatus), the paging information is responded via the random access procedure, or if the identifier is a second identifier, the paging information is responded on the at least one pre-configured resource, e.g. by sending a paging response (e.g. message) on the at least one pre-configured resource. Examples of such a first and/or second paging identifier may be I-RNTI (Inactive-Radio Network Temporary Identifier), and/or a flag e.g. in the paging information, to name but a few non-limiting examples.

Such an identifier may not influence the response to the paging information of the apparatus according to the first exemplary aspect, but may be an implicit indication of whether a response (e.g. initiating of at least one transmission) to the paging information should be sent using a random access procedure or from a/the at least one pre-configured resource.

The paging information may be at least indicative of an identifier of at least one mobile device e.g. represented by the apparatus. For instance, such an identifier may be associated with the apparatus. The apparatus may check the obtained paging information of whether or not an identifier of the paging information is associated with the apparatus (or respective mobile device performing and/or controlling the checking). In case at least one identifier of the paging information is associated with the apparatus, the apparatus may know that information and/or content represented by the paging information is intended for or to be obtained (e.g. received) by the apparatus. For instance, such an information and/or content indicated in the paging information may enable the apparatus (e.g. mobile device; and/or UE) to reply to the paging information via pre-configured PUSCH resources, to name but a few non-limiting examples. Thus, by obtaining the paging information, the apparatus (e.g. mobile device) may be allowed to utilize the at least one pre-configured resource (e.g. at least one of the pre-configured PUSCH resources). The at least one pre-configured resource may be utilized for a transmission of data (e.g. uplink data in case of pre-configured PUSCH resources).

For instance, (e.g. actual) downlink data may be sent in at least one pre-configured PDSCH resource that may be valid after the paging information is responded by the apparatus, e.g. by establishing the connection.

For instance, if the apparatus (e.g. UE) receives a paging information (e.g. paging message) targeted to its regular identifier, it will use a regular random access procedure to respond, e.g. establish the connection. Vice-versa, if it receives a paging message targeted to another identifier configured for such purpose, this is indicative that the paging response should be carried using pre-configured resource(s), e.g. the connection is established via the pre-configured resource(s). For instance, such an identifier may indicate how to respond the paging, where e.g. S-TMSI (Serving Temporary Mobile Subscriber Identity) would lead to a normal connection establishment or connection resume via random access, and I-RNTI or an additional value of one of the existing identifier or anew identifier (value) would lead to initiating of the at least one transmission via the at least one pre-configured resource.

The initiating of the at least one transmission via the at least one pre-configured resource may for instance be done by sending a respective paging response (e.g. a paging response message) on the at least one pre-configured resource, in case e.g. using of pre-configured PUSCH resources is allowed for MT access. For instance, in the alternative to initiating the at least one transmission via a respective at least one pre-configured resource, the apparatus may also initiate the at least one transmission via a random access procedure to take place, e.g. by responding the paging with initiating the random access procedure, e.g. by sending a random access preamble to the mobile communication network (e.g. base station, e.g. an apparatus according to the second exemplary aspect). Such a random access procedure may be a standard procedure enabled by mobile communication networks, and may for instance assign and/or allocate a respective resource (e.g. not pre-configured on part of the apparatus, and/or that was not used or utilized earlier for a (e.g. uplink and/or downlink) transmission of data by the apparatus).

The random access procedure may be defined according to the used communication standard of the mobile communication network and may be used to establish an uplink and/or downlink connection for the transmission of data. With such a random access procedure, it may be communicated to a respective mobile device which resource(s) it can use on a shared channel (e.g. PUSCH for uplink transmission of data and/or PDSCH for downlink transmission of data), thus, e.g. respective resource(s) are assigned and/or allocated prior to the apparatus being enabled to transmit and/or receive data.

In New Radio (NR) or future standard mobile communication networks, there may be RRC states in or between which a respective mobile device may change. The respective mobile device may be assigned by the mobile communication network a respective RRC state. The respective mobile device may be assigned e.g. a so-called RRC Connected, Inactive or an Idle State. The respective mobile device may initiate a state transition (e.g. a RRC state transition) from an INACTIVE/IDLE state, e.g. if uplink data appears in buffers (e.g. UE buffers) or whenever the mobile communication network pages the respective mobile device. In case the mobile communication network pages the respective mobile device, the respective mobile device may stay e.g. without completely releasing the RRC connection. This may apply e.g. when there is no traffic. From the INACTIVE state, the respective mobile device may be enabled quickly to switch back to an RRC connected state, e.g. if necessary.

In particular, example embodiments according to all aspects may be utilized e.g. by small data transmissions e.g. when a respective mobile device is in an INACTIVE state. Such an INACTIVE state may also be referred to as RRC INACTIVE state. In such an INACTTIVE state, e.g. uplink and/or downlink (e.g. small) data transmissions using RACH (Random Access Channel)-based schemes may be enabled. For instance, 2-step-based SDT (Small Data Transmissions) may be enabled on pre-configured PUSCH resources. Further, SDT not using RACH but pre-configured PUSCH resources may be enabled. Example embodiments according to all exemplary aspect enable to e.g. reuse a configured grant (e.g. grant type 1) when Time Alignment is valid (e.g. according to a time-alignment timer). For instance, such data transmissions (e.g. uplink and/or downlink) may be CG (Configured Grant)-based SDT, and/or pre-configured grant-SDT, to name but a few non-limiting examples.

Additionally or alternatively, example embodiments according to all aspects may be utilized e.g. in LTE for pre-configured uplink resources (PUR) based early data transmission (EDT), e.g. as a functionality defined e.g. for feMTC (Further enhanced Machine Type Communication) use cases. For instance, such a functionality may be equal to or similar to above disclosed pre-configured grant SDT in NR.

According to an exemplary embodiment of all exemplary aspects, wherein, if the response to the paging information is on the at least one pre-configured resource, the random access procedure is avoided.

In case the random access procedure is initiated, the random access procedure may be performed and/or controlled according to legacy standard (e.g. 3GPP TS (Technical Specification) 36.331 and/or TS 38.331, to name but a few non-limiting examples.

The response to the paging information is on the at least one pre-configured resource, e.g. by the response to the paging information being transmitted on the at least one pre-configured resource.

In case the paging information is responded from the at least one pre-configured resource (e.g. with a paging response message, e.g. to establish the connection), it is enabled to avoid, omit and/or not need such a random access procedure.

According to an exemplary embodiment of all exemplary aspects, the response to the paging information on the at least one pre-configured resource is a paging response message.

The paging information may be a paging message. The paging information may further indicate which resources (e.g. the at least one resource, or the at least one resource of a plurality of pre-configured (e.g. PUSCH) resources that may be obtained e.g. by obtaining resource information, more details are disclosed below) shall be used for responding the paging. For instance, the paging information may be indicative of at least one resource among a set of resources (e.g. obtained via resource information) comprising at least one of: random access resources (e.g. a PRACH (Preamble RACH) preamble valid for responding the paging (e.g. the paging information)), a pre-configured PUSCH resource valid to responding the paging (e.g. paging information), a specific PUSCH resource to be used for responding the paging (e.g. the paging information), or a combination thereof.

The pre-configured (e.g. PUSCH) resource(s) to be used for responding the paging information may be configured to the apparatus (i.e. UE specific) via RRC signaling while the apparatus is/was in RRC Connected mode, e.g. at RRC release with Suspend Configuration that may move the apparatus to Inactive state. Alternatively, the pre-configured (e.g. PUSCH) resource(s) could be broadcasted in the cell. Alternatively, the pre-configured (e.g. PUSCH) resource(s) can be indicated in or comprised by the paging information.

According to an exemplary embodiment of all exemplary aspects, the paging information comprises or represents an indication that using of the at least one resource for MT access is allowed. This may for instance be above disclosed paging identifier of the apparatus that is different from the regular paging identifier of the apparatus.

The indication may for instance be a flag, e.g. binary bit set to the value "0" or "1". In this way, the apparatus obtaining the paging information may know whether it (the apparatus according to the first exemplary aspect) can use the at least one pre-configured resource and, thus, is enabled to determine the paging response information accordingly. The indication may also be given to the apparatus by the provision of the paging information.

The apparatus (e.g. a mobile device) may determine to respond the (e.g. obtained) paging information via a respective pre-configured PUSCH resource e.g. by avoiding a respective random access procedure, or in contrast, via performing and/or controlling a respective random access procedure, as disclosed above. The latter may for instance be done in case the apparatus (e.g. mobile device) may know (e.g. based, at least in part, on (e.g. historic) channel quality information) that the at least one resource may not have sufficient quality for the transmission of data, and/or the apparatus (e.g. mobile device) moves in such a way (e.g. out of the coverage of the mobile communication network) that the at least one resource may be subject to interferences, to name but a few non-limiting examples).

According to an exemplary embodiment of the first exemplary aspect, the method further comprises:
    obtaining at least resource information indicative of one or more pre-configured resources to be utilized for the response to the paging information.

The at least resource information may be obtained, e.g. by receiving the at least resource information, e.g. from a base station (e.g. gNB) of a mobile communication network. The at least resource information may be obtained (e.g. received) via broadcast and/or dedicated signaling to the apparatus. Alternatively or additionally, the at least resource information may be provided together with paging information, e.g. by being comprised by the paging information and/or by being associated with the paging information. The at least resource information may be updatable or renewable by one or more further resource information. The at least resource information may be associated with a timer after which lapsing the at least resource information may be invalid, to name but one non-limiting example.

The at least resource information may comprise or represent pre-configured resource(s) that may be used or utilized for responding the paging information. This may allow a transmission (e.g. uplink transmission) of data to take place via one or more of the respective resources of the at least resource information. The one or more resources may be part of a set of resources. Thus, the at least resource information may comprise or represent such a set of resources. A respective resource may represent how a channel usable by a plurality of mobile devices in the mobile communication network, thus, which is shared by the plurality of mobile devices can be used by the apparatus. For instance, a timing and/or frequency of the channel may be associated to the apparatus. This may be represented by a respective resource of the at least resource information, at least by a part of it. Such a shared channel may be the PUSCH, to name but a few non-limiting examples. As used herein, the one or more resources may be pre-configured resources.

The determining of whether at least one pre-configured resource is to be utilized for responding to the paging information, may comprise selecting the at least one pre-configured resource among a plurality of available resources, e.g. as defined by the at least resource information. Then, the paging information may be responded from the selected at least one pre-configured resource.

According to an exemplary embodiment of the first exemplary aspect, the method further comprises:

storing the obtained at least resource information.

After the at least resource information is obtained, the apparatus may e.g. further, store the at least resource information, in a memory (e.g. comprising a database) comprised by the apparatus (e.g. mobile device) and/or being connectable to the apparatus.

According to an exemplary embodiment of all exemplary aspects, the method further comprises:

suspending one or more of the one or more pre-configured resources after the one or more pre-configured resources are not used for a maximum number of consecutive occasions for a transmission of data.

According to an exemplary embodiment of the second exemplary aspect, the method further comprises:

resuming at least one suspended pre-configured resource.

For instance, if the apparatus according to the first exemplary aspect (e.g. UE) was configured with a maximum number of consecutive unused/failed pre-configured PUSCH resource occasions after which the apparatus (e.g. UE) cannot use the resources anymore (i.e. after that the resources have to be implicitly released), the UE suspends the pre-configured PUSCH resources. The mobile communication network (e.g. the apparatus according to the second exemplary aspect, e.g. a base station) can then resume the suspended pre-configured (e.g. PUSCH) resource(s), e.g. for MT access with a paging information (e.g. paging message). Such indication to resume the resource(s) may or may not be different from the indication to use resource(s) for MT access.

Additionally or alternatively, the paging information (e.g. the paging message) may indicate that the apparatus (e.g. a mobile device) shall not use at least one pre-configured resource (e.g. at least one resource of the obtained resource information). Then, the apparatus may suspend the respective pre-configured resource accordingly, as disclosed above.

For instance, a respective mobile device (e.g. UE; apparatus according to the first exemplary aspect) may be configured with a maximum number of consecutive unused/failed pre-configured PUSCH resource occasions after which the respective mobile device cannot use the respective pre-configured resources anymore. Then, the apparatus may suspend the respective pre-configured resource.

The one or more pre-configured resources may be re-activated (e.g. implicitly). For instance, after lapsing of a corresponding timer, the respective resource(s) may be suspended. Thus, the respective mobile device may suspend one or more of the pre-configured PUSCH resources, and then, re-active the one or more pre-configured PUSCH resource by responding the paging information on the respective pre-configured resource. Such pre-configured PUSCH resources may have been assigned to the apparatus based on one or more random access procedures.

According to an exemplary embodiment of the first exemplary aspect, the apparatus is or is part of a mobile device and/or an Internet-of-Things, IoT device.

The paging information may be provided (e.g. sent) by the apparatus according to the second exemplary aspect, e.g. to one or more respective apparatuses according to the first exemplary aspect.

According to an exemplary embodiment of all exemplary aspect, the at least one pre-configured resource is configured with broadcast and/or dedicated signaling. For instance, how the preconfigured PUSCH is configured may be enabled. In one exemplary embodiment, the pre-configured (e.g. PUSCH) resource(s) for MT access (for responding to the paging information) is (are) configured with broadcast and/or dedicated signaling. For example, system information/ RRC Reconfiguration/RRC Release messages can be used for such provisioning. These resources can be different than regular resources, e.g. the resources assigned for regular UL transmission of an UL small payload on pre-configured PUSCH resource(s) in INACTIVE (e.g. state of the apparatus according to the first exemplary aspect; e.g. UE).

The paging information may be provided e.g. by a base station (e.g. gNB) of the mobile communication network, e.g. by broadcasting the paging information and/or by dedicated/common signaling of the paging information to a respective mobile device (e.g. apparatus according to the first exemplary aspect).

The paging information may be provided e.g. periodically, e.g. to the respective one or more mobile devices. The paging information may be provided e.g. during DRX active time during which the apparatus monitors for PDCCH. Further, the apparatus can detect the paging DCI in the PDCCH, e.g. at a wake up of the respective one or more mobile devices as a part of performing and/or controlling a DRX procedure.

In case the paging information is broadcasted, the respective mobile device may be enabled to obtain (e.g. receive) the paging information based on one or more identifiers being comprised or represented by the paging information. The respective identifiers may be indicative of a respective mobile device of the one or more mobile devices. The respective identifier may enable the respective mobile device to determine (e.g. check) whether or not the paging information, or a part of information comprised or represented by the paging information, are intended for the respective mobile device. Thus, the respective mobile device may have their respective identifier available, e.g. the respective identifier may be stored in a memory of the respective mobile device, or a memory that is connectable to the respective mobile device.

In case a respective mobile device wants to transmit data, the respective mobile device may respond to an obtained paging information e.g. by initiating at least one transmission. This may be initiated e.g. by providing (e.g. sending) a paging response message on the at least one pre-configured resource of a mobile communication network to the apparatus according to the second exemplary aspect. By responding to the paging information from such at least one pre-configured resource, it is enabled to avoid a random access procedure.

According to an exemplary embodiment of the second exemplary aspect, a random access preamble is obtained e.g. to initiate the at least one transmission and/or a random access procedure. In case the paging information is not responded by initiating the at least one transmission on the at least one pre-configured resource, a random access procedure may be initiated by the apparatus according to the first exemplary aspect. Then, the apparatus (according to the second exemplary aspect) may obtain (e.g. receive) a respective random access preamble initiating the random access procedure to take place.

According to an exemplary embodiment of the second exemplary aspect, the method further comprises:
providing at least resource information indicative of one or more pre-configured resources to be utilized for a response to the paging information on the one or more pre-configured resources; wherein the response is received on at least one of the one or more pre-configured resources.

The at least resource information may be provided by the apparatus according to the second exemplary aspect, e.g. to a respective mobile device (e.g. apparatus according to the first exemplary aspect). The at least resource information may be provided to the respective mobile device, e.g. by addressing the at least resource information via an identifier of the respective mobile device to the mobile device. In this way, the at least resource information may be provided to the respective mobile device via dedicated signaling to the respective mobile device. Additionally or alternatively, the at least resource information may be provided to the respective mobile device also via a broadcast.

For instance, the mobile communication network may configure the at least one pre-configured resource (e.g. at least one pre-configured PUSCH resource) for MT access, e.g., in a RRC Release message, such that the at least one resource can be used for MT access. This may allow the at least one pre-configured resource to be utilized in case a paging information is responded too from the at least one pre-configured resource by a respective mobile device. The at least one pre-configured resource may be used for MT access, e.g. upon indication from the mobile communication network, for instance, via the paging information (e.g. in a respective paging message).

The respective mobile device may be switched into such a RRC connected state after the respective mobile device has responded to the paging information from the at least one resource. When the respective mobile device is set into the connected state from the INACTIVE state, the respective mobile device is enabled to transmit data (e.g. uplink and/or downlink data) e.g. without needing to perform and/or control a random access procedure. Thus, avoidance of such a random access procedure is enabled, since e.g. at least one resource can be used for the transmission of data.

According to an exemplary embodiment of the second exemplary aspect, the apparatus is or is part of a base station of the mobile communication network.

The features and example embodiments described above may equally pertain to the different aspects.

It is to be understood that the embodiments and aspects in this section is merely by way of examples and non-limiting.

Other features will become apparent from the following detailed description considered in conjunction with the accompanying drawings. It is to be understood, however, that the drawings are designed solely for purposes of illustration, for which reference should be made to the appended claims. It should be further understood that the drawings are not drawn to scale and that they are merely intended to conceptually illustrate the structures and procedures described herein.

BRIEF DESCRIPTION OF THE DRAWINGS

In the figures show.

DETAILED DESCRIPTION OF SOME EXEMPLARY EMBODIMENTS

The following description serves to deepen the understanding of the exemplary embodiments and shall be understood to complement and be read together with the description as provided in the above summary section of this specification.

Figure 1:
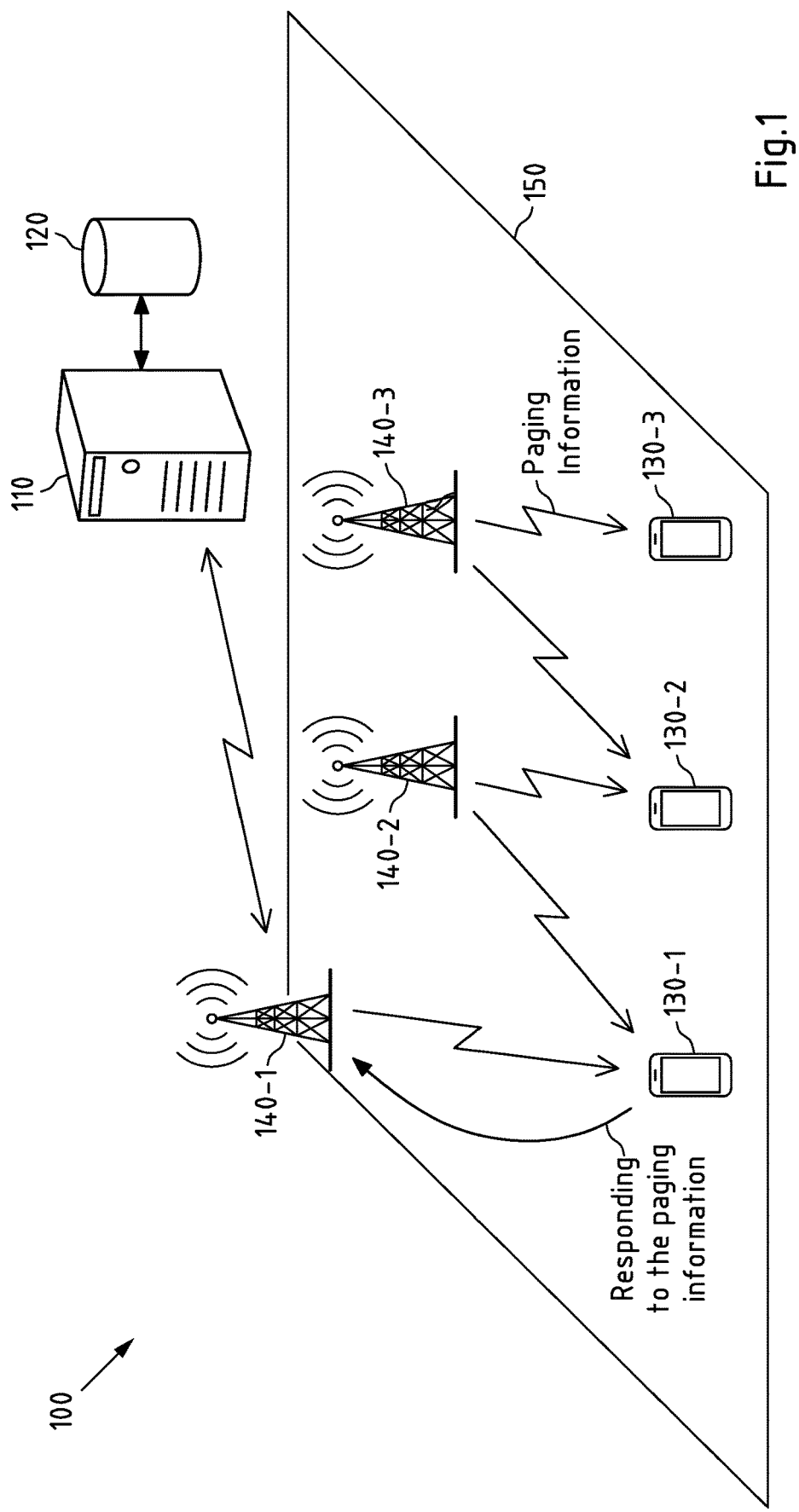
FIG. 1 a schematic block diagram of a system according to an exemplary aspect.

FIG. 1 is an example of a schematic high-level block diagram of a system that is configured to perform and/or control the respective method(s) according to all exemplary aspects.

System 100 comprises a mobile communication network 150, which is schematically shown by the rectangular shape. It will be understood that this shape does not represent a coverage area of the mobile communication network 150, but a sort of grouping of one or more entities that may utilize the mobile communication network 150.

System 100 comprises one or more mobile devices 130-1, 130-2, and 130-3. A respective mobile device 130-1, 130-2, and 130-3 may be an apparatus according to the first exemplary aspect.

The system 100 further comprises a plurality of base stations, at present gNBs 140-1 to 140-3 which signals are observable by the mobile devices 130-1, 130-2, and 130-3. The base stations 140-1 to 140-3 are part of the mobile communication network 150. The base stations may be respective apparatuses according to the second exemplary aspect. The base stations may provide (e.g. sent) paging information (illustrated by the arrows labeled with "Paging Information) to the mobile devices 130-1, 130-2, and 130-3. Such paging information may enable the mobile devices 130-1, 130-2, and 130-3 to perform and/or control initiate at least one transmission and then, a transmission of data according to example embodiments of all exemplary aspects may take place. Based on obtained paging information, the mobile devices 130-1, 130-2, and 130-3 may determine how to respond the paging information. The mobile devices 130-1, 130-2, and 130-3 may be determined whether at least one pre-configured resource of the mobile communication network 150 is to be utilized for responding to the paging information. Further, based on such a determining, a respective mobile device can respond to the paging information, e.g. on the at least one pre-configured resource to a respective base station 140-1, 140-2, or 140-3, e.g. for responding to the paging information. Alternatively, e.g. in case it is determined that at least one pre-configured resource of the mobile communication network 150 is not to be utilized for responding to the paging information, the respective mobile device can respond to the paging information by initiating at least one transmission via at least one random access procedure.

System 100 may optionally comprise a server 110, e.g. providing certain services to the base stations 140-1 to 140-3 and/or the mobile devices 130-1, 130-2, and 130-3. Optionally, the server 110 may comprise or be connectable to a database 120, e.g. for storing information, such as resource information, paging information, paging response information, or a combination thereof, to name but a few non-limiting examples.

To enable communication between the mobile device 130-1, 130-2, and 130-3, one or more of the base stations 140-1 to 140-3, and/or the server 110, and/or further entities not shown in FIG. 1, the mobile communication network of the system 100 may be used. The mobile communication network may be a cellular (e.g. according to 3G/4G/5G/NR or future communication standard) network. Additionally or alternatively, a non-cellular communication network, such as a satellite-based communication network or the Internet may also be utilized to enable communication, to name but a few non-limiting examples. The communication may be wireless as is illustrated in FIG. 1 by the arrows pointing between the base stations 140-1 to 140-3 and the mobile device 130-1, 130-2, and 130-3. In FIG. 1, the arrows point towards the mobile device 130 to illustrate that the signals of the base stations 140-1 to 140-3 are observable by the mobile device 130. It will be understood that information may be sent from the mobile device to or via the base stations 140-1 to 140-3 as well. Further communication is illustrated by the arrows pointing between the base stations 140-1 to 140-3 and the server 110.

Example embodiments enabling respective method(s) according to the first, second and/or third exemplary aspect may utilize the architecture shown by the system 100 of FIG. 1.

The mobile devices 130-1, 130-2 and 130-3 (e.g. representing respective UEs) may be enabled to use pre-configured PUSCH resources (e.g. at least one pre-configured resource, e.g. comprised or represented by at least resource information) e.g. for signaling related to MT access, i.e. for responding to a paging (e.g. paging information), e.g. by initiating at least one transmission. Moreover, based, at least in part, e.g. on a new indication (e.g. implicit indication or explicit indication) included or comprised in the paging message (e.g. paging information), the respective mobile device (e.g. UE) can determine which procedure, e.g. a random access procedure or a PCG-SDT procedure, thus, initiating at least one transmission to respond to the paging information on the at least one pre-configured PUSCH resource, to name but a few non-limiting examples, may be used for responding to the paging. Then, based at least in part on how it is determined to respond the paging information, e.g. whether at least one pre-configured resource of the mobile communication network is to be utilized for initiating at least one transmission via a random access procedure, or via the pre-configured (PUSCH) resource(s). Based on the determining, initiating at least one transmission via the random access procedure or on the at least one pre-configured resource(s) takes place.

Figure 2:
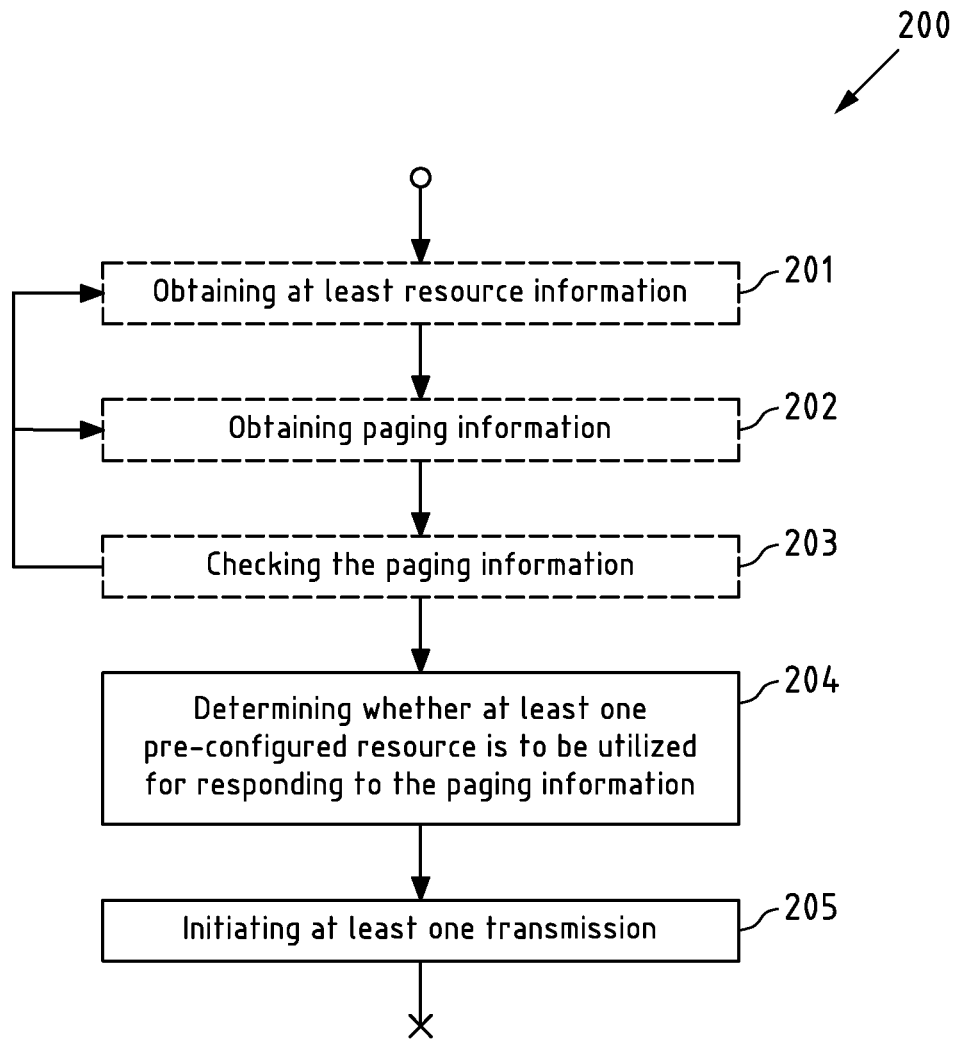
FIG. 2 a flowchart showing an example embodiment of a method according to the first exemplary aspect.

FIG. 2 is a flowchart 200 showing an example embodiment of a method according to the first exemplary aspect. This flowchart 200 may for instance be performed by a mobile device 130-1, 130-2, and/or 130-3 of FIG. 1.

In an optional first step 201, at least resource information are obtained (e.g. received). The at least resource information may be obtained from a base station (e.g. gNB, e.g. base station 140-1, 140-2, 140-3 of FIG. 1) of a mobile communication network. Additionally or alternatively, the at least resource information may be obtained from a server (e.g. server 110 of FIG. 1) of the mobile communication network.

In an optional second step 202, paging information is obtained (e.g. received). The paging information may be obtained from a base station (e.g. gNB, e.g. base station 140-1, 140-2, 140-3 of FIG. 1) of a mobile communication network. Additionally or alternatively, the at least resource information may be obtained from a server (e.g. server 110 of FIG. 1) of the mobile communication network, e.g. together with the paging information. The paging information may be obtained periodically, e.g. indicated by the arrow pointing back from step 203 to any of the steps 201 and 202.

In an optional third step 203, the paging information obtained in step 202 is checked, in particular whether or not the paging information comprises information intended for the apparatus performing and/or controlling flowchart 200. This may be checked by checking one or more identifiers that may be comprised by the paging information obtained in step 202.

In a fourth step 204, it is determined whether at least one pre-configured resource of a mobile communication network is to be utilized for responding to the paging information. Thus, it may be determined how to respond the paging information. The determining may be, e.g. based, at least in part, on at least one of whether the apparatus performing and/or controlling the flowchart 200 has valid timing advance, whether the apparatus has at least one valid pre-configured resource, or whether the apparatus has received an indication that the at least one pre-configured resource is to be utilized for responding to the paging information. Step 204 may be performed and/or controlled in the case in step 203 that it is checked that the paging information comprises information that is intended for the apparatus performing and/or controlling flowchart 200. The response may be determined, e.g. based, at least in part, e.g. on a (e.g. new) indication included or comprised in the paging information (e.g. paging message of step 202). For instance, the apparatus (e.g. a mobile device, e.g. a UE) can determine which procedure, e.g. a random access procedure or a PCG-SDT procedure, to name but a few non-limiting examples may be used for initiating at least one transmission. The latter may be initiated by e.g. by sending a paging response message to initiate a connection establishment on the at least one pre-configured resource.

In a fifth step 205, the at least one transmission is initiated, e.g. by outputting (e.g. sending) a response (e.g. paging response message or initiating a random access procedure by sending a random access preamble), e.g. to a base station. The at least one transmission may be initiated to the base station from which the paging information in step 202 stems, to name but one non-limiting example. This may initiate the at least one transmission, e.g. to establish a connection. The respective base station may be a respective base station 140-1, 140-2, and/or 140-3 of FIG. 1. The respective base station may perform and/or control flowchart 300 of FIG. 3.

Figure 3:
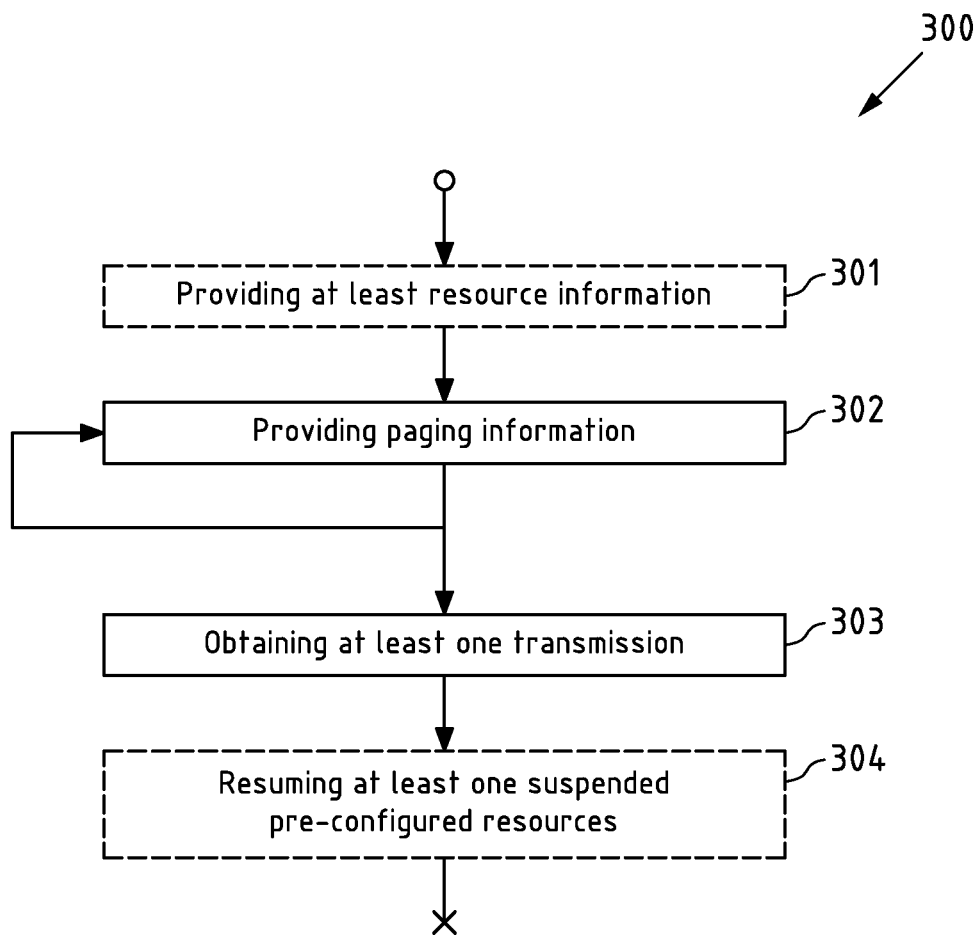
FIG. 3 a flowchart showing an example embodiment of a method according to the second exemplary aspect.

FIG. 3 is a flowchart 300 showing an example embodiment of a method according to the second exemplary aspect. This flowchart 300 may for instance be performed by a respective base station 140-1, 140-2, and/or 140-3 of FIG. 1.

In an optional step 301, at least resource information indicative of e.g. one or more pre-configured resources e.g. to be used responding to a paging information, (e.g. for a PCG-SDT procedure), are provided to one or more mobile devices. The at least resource information may be part of the paging information (see step 302), or may be provided (e.g. sent) to a respective mobile device separately, e.g. by a dedicated signaling or may be provided (e.g. sent) to one or more mobile devices, e.g. by a broadcast signaling, to name but a few non-limiting examples.

In a second step 302, paging information is provided, e.g. by sending the respective paging information to one or more mobile devices (e.g. mobile device 130-1, 130-2, and/or 130-3 of FIG. 1). The paging information may be provided via a broadcast so that the paging information is obtained by the respective mobile device(s). Additionally or alternatively, the paging information may be provided by dedicated signaling to a certain mobile device.

The paging information may be provided, as illustrated by the arrow pointing back to step 302.

In a third step 303, at least one transmission may be obtained (e.g. received). The at least one transmission may be a paging response message to the paging information of step 302, e.g. by receiving the paging response message from a respective mobile device which has obtained the paging information. The at least one transmission may indicate that e.g. a PCG-SDT procedure is selected to initiate the at least one transmission by the respective mobile device. Since the at least one transmission is obtained (e.g. received) on at least one pre-configured resource, an avoidance of a respective random access procedure is enabled. Such a random access procedure may be used for allocating a resource to enable a connection establishment utilizable by the respective mobile device e.g. for a transmission of data. In an optional fourth step 304, at least one suspended pre-configured resource may be resumed. The transmission of data (e.g. downlink data) may be performed on at least one pre-configured PDSCH resource that may be valid after the paging information is responded by the mobile device. Thus, the at least one transmission is received by the network (e.g. the apparatus performing and/or controlling the flowchart 300).

One or more steps of the flowchart 200 of FIG. 2, and of the flowchart 300 of FIG. 3 may be performed and/or controlled together for enabling example embodiments of a method according to the third exemplary aspect. In this way, one or more mobile devices (e.g. mobile device 130-1, 130-2, and/or 130-3 of FIG. 1) performing and/or controlling flowchart 200 of FIG. 2, and one or more base stations (e.g. base stations 140-1, 140-2, and/or 140-3 of FIG. 1) performing and/or controlling flowchart 300 of FIG. 3 may perform and/or control the method according to the third exemplary aspect together (e.g. at least partially jointly).

Figure 4:
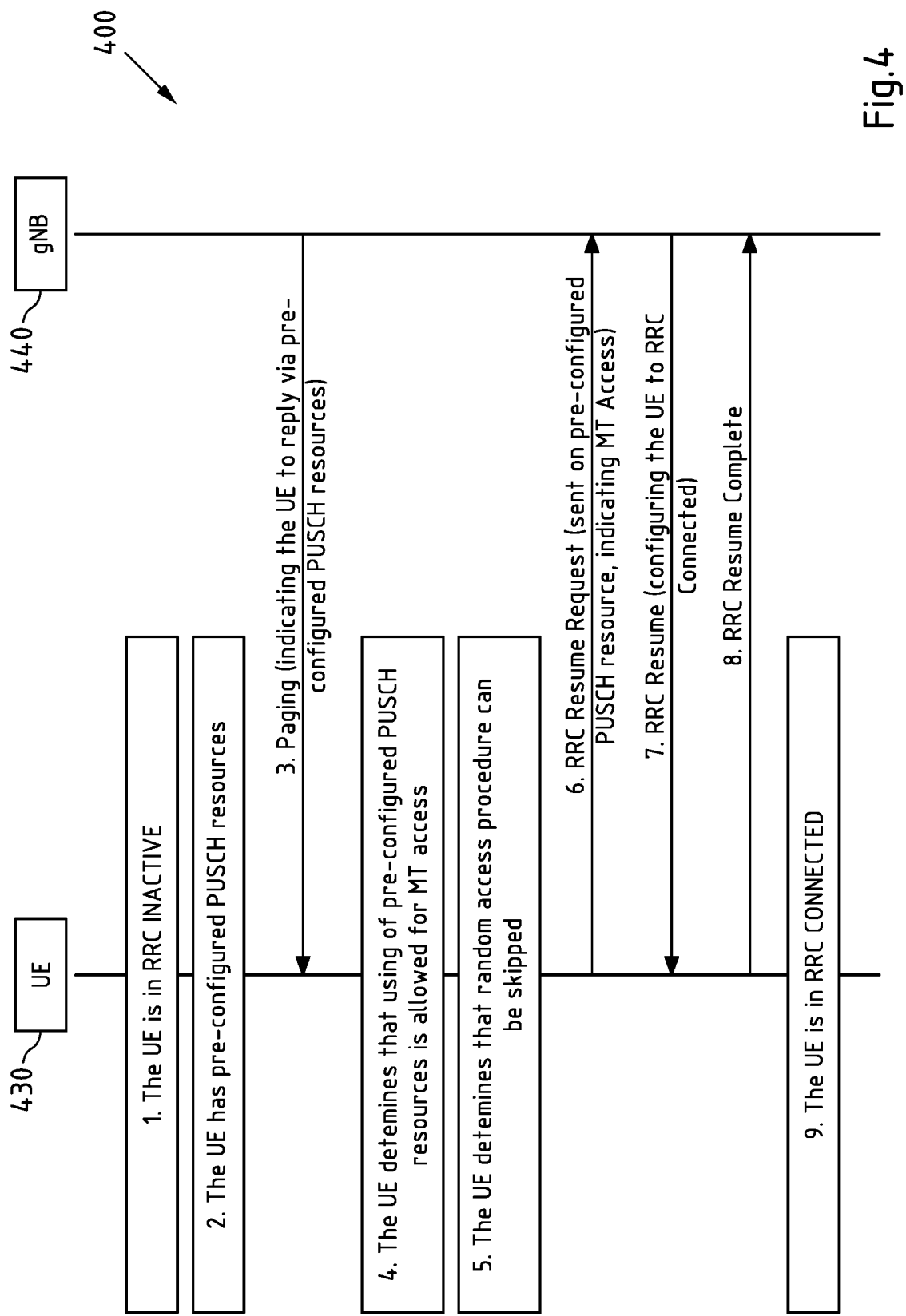
FIG. 4 a signaling associated with example embodiments of all exemplary aspects.

FIG. 4 shows signaling associated with example embodiments of all exemplary aspects. The example embodiment may utilize system 100 of FIG. 1. For instance, the signaling 400 may enable pre-configured PUSCH and/or PDSCH resource(s) for MT access.

Signaling 400 of FIG. 4 is shown between a mobile device, e.g. UE 430, and a base station, e.g. gNB 440. UE 430 may be represented by a respective mobile device 130-1, 130-2, and/or 130-3 of FIG. 1. gNB 440 may be represented by a respective base station 140-1, 140-2, and/or 140-3 of FIG. 1.

The signaling may utilize legacy specifications 36.331, 38.331 of the 3GPP. In contrast to receiving a paging by the UE 430 that triggers a random access procedure when the UE 430 is in RRC INACTIVE state (step 1), the UE 430 may have one or more pre-configured PUSCH resources, e.g. provided to the UE 430 by the gNB 440 (see e.g. step 201 of FIG. 2).

Paging information (e.g. paging indicating the UE 430 to reply via pre-configured PUSCH resources) is provided from gNB 440 to UE 430 (step 3).

In step 4, the UE 430 determines that using of pre-configured PUSCH resources is allowed for MT access. This may for instance be indicated in the paging of step 3.

Then, in step 5, the UE 430 determines that random access procedure can be avoided or is not needed e.g. by determining how to respond to the paging information based on which, at least in part, a responding to the paging information (e.g. paging message of step 3) is done.

In step 6, the UE 430 provides (e.g. sends) a response to the paging (e.g. paging information to the gNB 440, e.g. as a RRC Resume Request message, or a part of it. The response to the paging information may be provided (e.g. sent) on the at least resource, e.g. sent on pre-configured PUSCH resource, indicating MT access.

In step 7, the gNB 440 replies to the obtained (e.g. received) response (e.g. the RRC Resume Request), e.g. by providing transmission resume information, e.g. comprising or being represented by a RRC Resume message, or a part of it. Such RRC Resume message may be enabled by the corresponding 3GPP legacy specifications.

The UE 430 may answer the transmission resume information by an RRC Resume Complete message. For instance, providing the RRC Resume message from the gNB 440 to the UE 430 may trigger the UE 430 to enter or switch to or select the RRC connected state, as shown in step 9.

Figure 5:
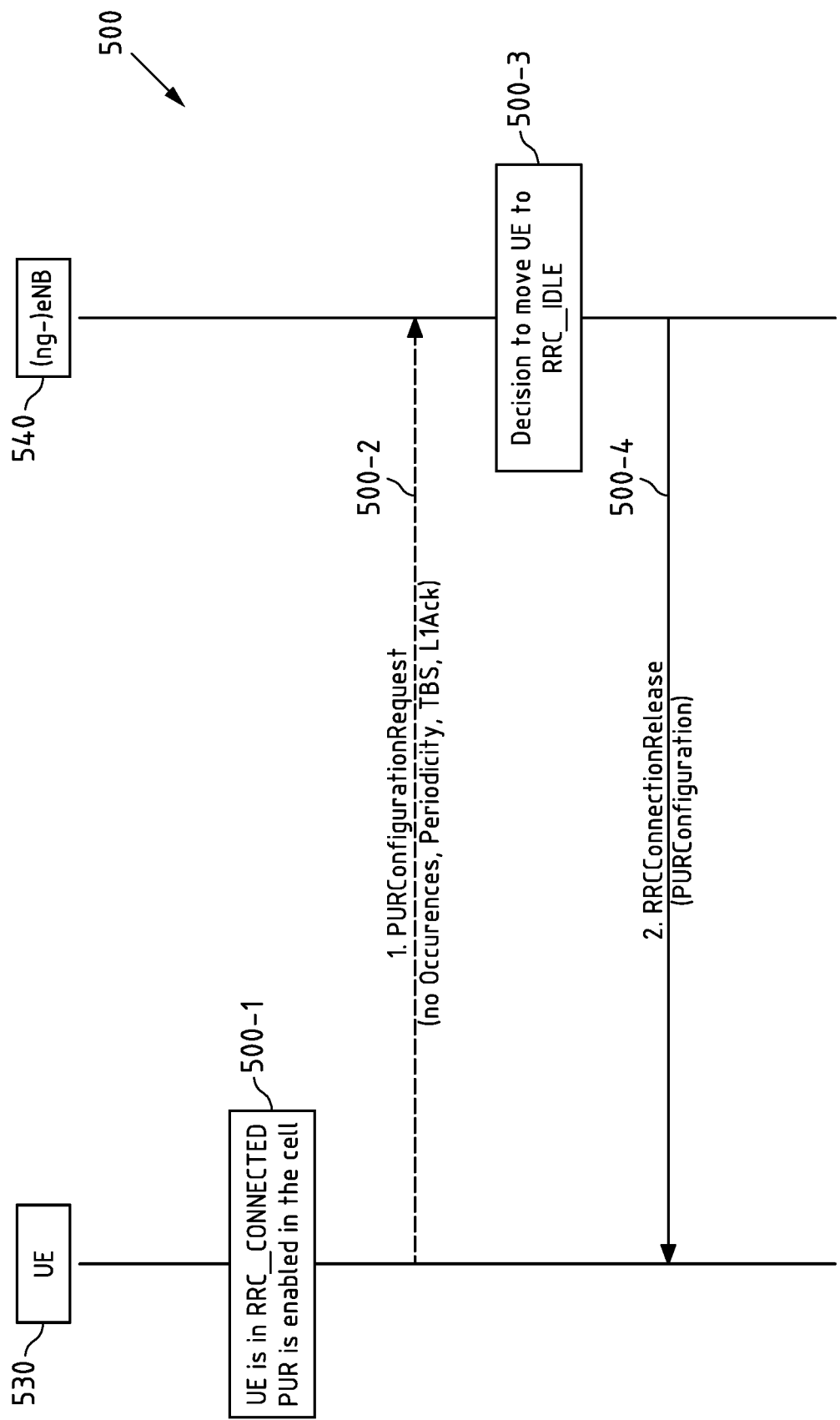
FIG. 5 another signaling associated with example embodiments of all exemplary aspects.

FIG. 5 shows another signaling associated with example embodiments of all exemplary aspects. The example embodiment may utilize system 100 of FIG. 1.

Signaling 500 of FIG. 5 is shown between a mobile device, e.g. UE 530, and a base station, e.g. (ng-) eNB 540. UE 530 may be represented by a respective mobile device 130-1, 130-2, and/or 130-3 of FIG. 1. (ng-) eNB 540 may be represented by a respective base station 140-1, 140-2, and/or 140-3 of FIG. 1. For instance, the signaling 500 may enable PUR-based EDT request and resource configured, as e.g. utilized by 3GPP Technical Specification 36.300, to name but one non-limiting example.

In a step 500-1, it is shown that the UE 530 is in RRC_CONNECTED state. PUR is enabled in the cell of a mobile communication network e.g. according to LTE communication standard.

In an optional step 500-2, the UE 530 provides (e.g. sends) a message (e.g. as a response to paging information) to the (ng-) eNB 540. Here, the message is a PURConfigurationRequest message, or a part of it. This is shown by the dotted arrow 500-2 in FIG. 5.

Example embodiments according to all exemplary aspect may be utilized e.g. in LTE for PUR based EDT (Early Data Transmission) functionality, as shown in FIG. 5. Such EDT functionality is defined for feMTC use cases, which is similar to above disclosed PCG-SDT in NR.

Figure 6:
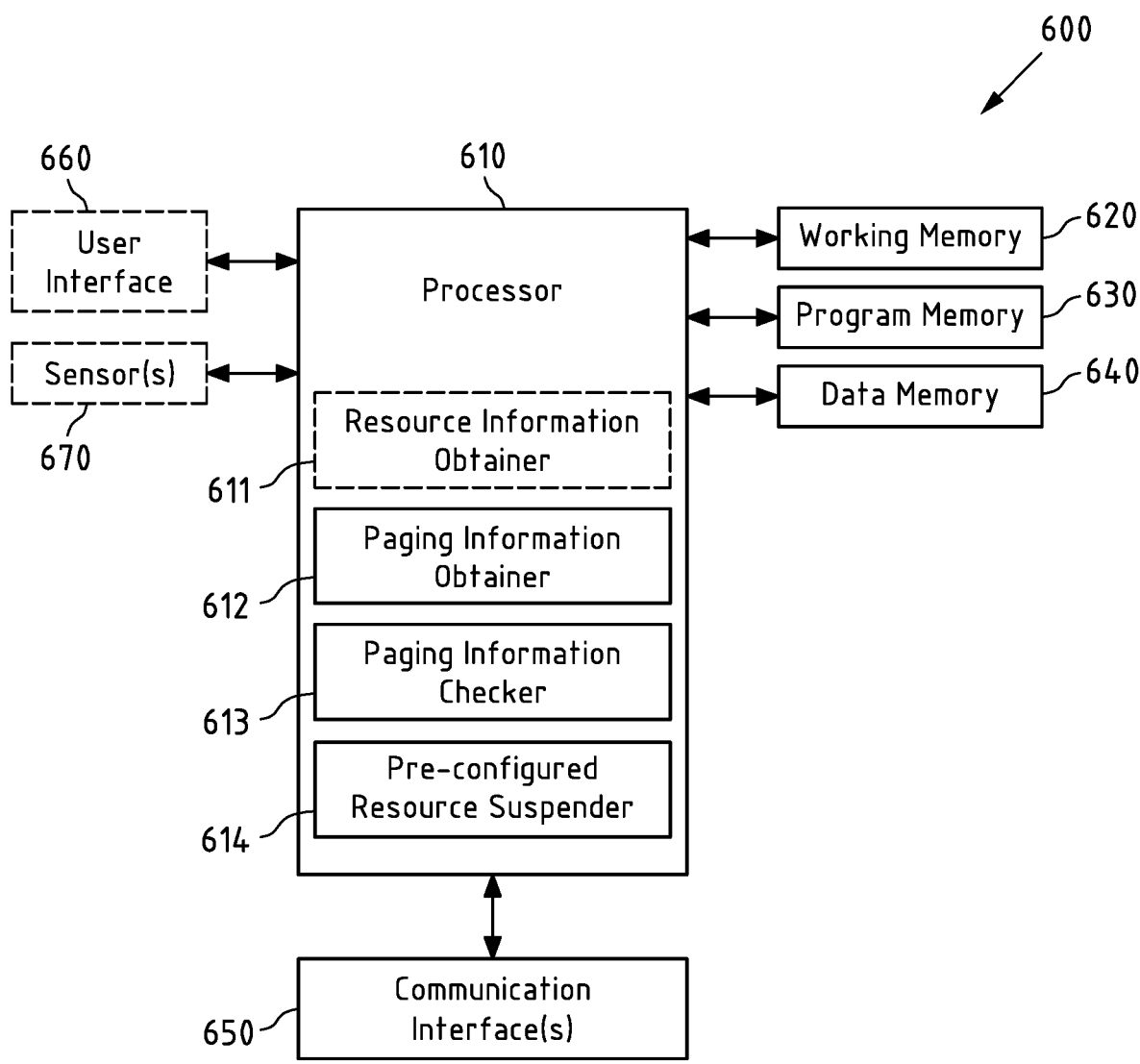
FIG. 6 a schematic block diagram of an apparatus configured to perform the method according to the first exemplary aspect.

FIG. 6 is a schematic block diagram of an apparatus 600 according to an exemplary aspect, which may for instance represent one of the mobile devices 130-1 to 130-3 of FIG. 1. In case apparatus 600 is configured to perform and/or control or comprise respective means (at least one of 610 to 670) for performing and/or controlling the method according to the first and/or third exemplary aspect, apparatus 600 may perform and/or control the method according to the first and/or third exemplary aspect together with apparatus 700 of FIG. 7.

Apparatus 600 comprises a processor 610, working memory 620, program memory 630, data memory 640, communication interface(s) 650, an optional user interface 660 and an optional sensor(s) 670.

Apparatus 600 may for instance be configured to perform and/or control or comprise respective means (at least one of 610 to 670) for performing and/or controlling the method according to the first and/or third exemplary aspects. Apparatus 600 may as well constitute an apparatus comprising at least one processor (610) and at least one memory (620) including computer program code, the at least one memory and the computer program code configured to, with the at least one processor, cause an apparatus, e.g. apparatus 600 at least to perform and/or control the method according to first and/or third exemplary aspects. In case apparatus 600 is configured to perform and/or control or comprise respective means (at least one of 610 to 670) for performing and/or controlling the method according to the first and/or third exemplary aspect, apparatus 600 may perform and/or control the method according to the first and/or third exemplary aspect together with apparatus 700 of FIG. 7.

Processor 610 may for instance comprise an optional resource information obtainer 611 as a functional and/or structural unit. Resource information obtainer 611 may for instance be configured to obtain (e.g. retrieve) respective resource information (see step 201 of FIG. 2).

Processor 610 may for instance comprise an optional paging information obtainer 612 as a functional and/or structural unit. Paging information obtainer 612 may for instance be configured to obtain (e.g. receive) respective paging information (see step 202 of FIG. 2).

Processor 610 may for instance comprise an optional paging information checker 613 as a functional and/or structural unit. Paging information checker 613 may for instance be configured to check respective paging information (see step 203 of FIG. 2).

Processor 610 may for instance comprise a pre-configured resource determiner 614 as a functional and/or structural unit. Pre-configured resource determiner 614 for instance be configured to determine whether at least one pre-configured resource of a mobile communication network is to be utilized for responding to the paging information (see step 204 of FIG. 2).

Processor 610 may for instance further control the memories 620 to 640, the communication interface(s) 650, the optional user interface 660 and the optional sensor(s) 670.

Processor 610 may for instance execute computer program code stored in program memory 630, which may for instance represent a computer readable storage medium comprising program code that, when executed by processor 610, causes the processor 610 to perform the method according to the first and/or third exemplary aspects.

Processor 610 (and also any other processor mentioned in this specification) may be a processor of any suitable type. Processor 610 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 610 may for instance be an application processor that runs an operating system.

Program memory 630 may also be included into processor 610. This memory may for instance be fixedly connected to processor 610, or be at least partially removable from processor 610, for instance in the form of a memory card or stick. Program memory 630 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 630 may also comprise an operating system for processor 610. Program memory 630 may also comprise a firmware for apparatus 600.

Apparatus 600 comprises a working memory 620, for instance in the form of a volatile memory. It may for instance be a Random Access Memory (RAM) or Dynamic RAM (DRAM), to give but a few non-limiting examples. It may for instance be used by processor 610 when executing an operating system and/or computer program.

Data memory 640 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 640 may for instance store resource information, paging information, transmission information, or a combination thereof, to name but a few non-limiting examples.

Communication interface(s) 650 enable apparatus 600 to communicate with other entities, e.g. with base stations 140-1 to 140-3, and/or server 110 of FIG. 1. The communication interface(s) 650 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 600 to communicate with other entities not shown in FIG. 1. Communication interface(s) may enable apparatus 600 to communicate with other entities, for instance with other mobile devices 130 of FIG. 1.

User interface 660 is optional and may comprise a display for displaying information to a user and/or an input device (e.g. a keyboard, keypad, touchpad, mouse, etc.) for receiving information from a user.

Sensor(s) 670 are optional and may for instance comprise a barometric sensor, e.g. to gather pressure information.

Some or all of the components of the apparatus 600 may for instance be connected via a bus. Some or all of the components of the apparatus 600 may for instance be combined into one or more modules.

Figure 7:
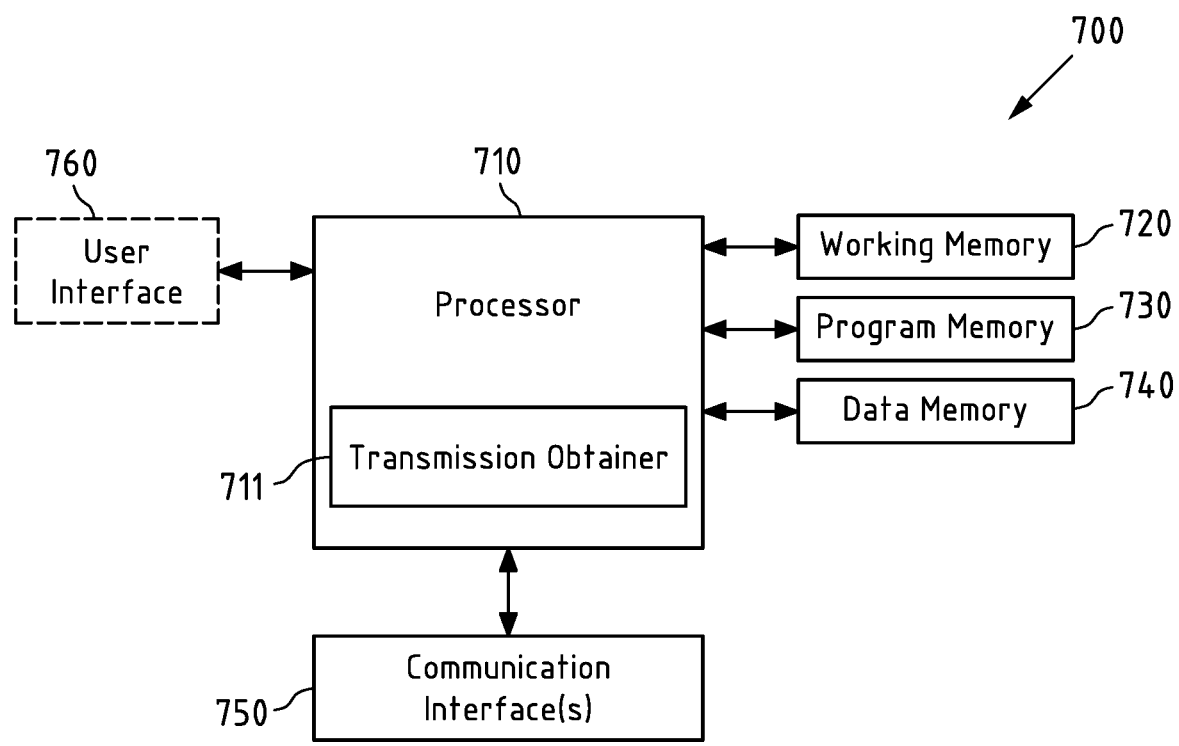
FIG. 7 a schematic block diagram of an apparatus configured to perform the method according to the second exemplary aspect.

FIG. 7 is a schematic block diagram of an apparatus 700 according to an exemplary aspect, which may for instance represent one of the base stations 140-1 to 140-3, and/or server 110 of FIG. 1. In case apparatus 700 is configured to perform and/or control or comprise respective means (at least one of 710 to 760) for performing and/or controlling the method according to the second and/or third exemplary aspect, apparatus 700 may perform and/or control the method according to the second and/or third exemplary aspect together with apparatus 600 of FIG. 6.

Apparatus 700 comprises a processor 710, working memory 720, program memory 730, data memory 740, communication interface(s) 750, and an optional user interface 760.

Apparatus 700 may for instance be configured to perform and/or control or comprise respective means (at least one of 710 to 760) for performing and/or controlling the method according to the second and/or third exemplary aspects. Apparatus 700 may as well constitute an apparatus comprising at least one processor (710) and at least one memory (720) including computer program code, the at least one memory and the computer program code configured to, with the at least one processor, cause an apparatus, e.g. apparatus 700 at least to perform and/or control the method according to second and/or third exemplary aspects. In case apparatus 600 is configured to perform and/or control or comprise respective means (at least one of 610 to 670) for performing and/or controlling the method according to the second and/or third exemplary aspect, apparatus 600 may perform and/or control the method according to the second and/or third exemplary aspect together with apparatus 600 of FIG. 6.

Processor 710 may for instance comprise a transmission obtainer 711 as a functional and/or structural unit. Transmission obtainer 711 may for instance be configured to obtain (e.g. receive) at least one transmission (see step 303 of FIG. 3), e.g. in response to a paging information sent by apparatus 700 (see step 302 of FIG. 3).

Processor 710 may for instance further control the memories 720 to 740, the communication interface(s) 750, the optional user interface 760 and the optional sensor(s) 770.

Processor 710 may for instance execute computer program code stored in program memory 730, which may for instance represent a computer readable storage medium comprising program code that, when executed by processor 710, causes the processor 710 to perform the method according to the second exemplary aspect.

Processor 710 (and also any other processor mentioned in this specification) may be a processor of any suitable type. Processor 710 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 710 may for instance be an application processor that runs an operating system.

Program memory 730 may also be included into processor 710. This memory may for instance be fixedly connected to processor 710, or be at least partially removable from processor 710, for instance in the form of a memory card or stick. Program memory 730 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 730 may also comprise an operating system for processor 710. Program memory 730 may also comprise a firmware for apparatus 700.

Apparatus 700 comprises a working memory 720, for instance in the form of a volatile memory. It may for instance be a Random Access Memory (RAM) or Dynamic RAM (DRAM), to give but a few non-limiting examples. It may for instance be used by processor 710 when executing an operating system and/or computer program.

Data memory 740 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 640 may for instance store resource information, paging information, paging response information, or a combination thereof, to name but a few non-limiting examples.

Communication interface(s) 750 enable apparatus 700 to communicate with other entities, e.g. with mobile devices 130-1 to 130-3 and/or server 110 of FIG. 1. The communication interface(s) 750 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 700 to communicate with other entities, for instance with other base stations 140 of FIG. 1.

User interface 760 is optional and may comprise a display for displaying information to a user and/or an input device (e.g. a keyboard, keypad, touchpad, mouse, etc.) for receiving information from a user.

Some or all of the components of the apparatus 700 may for instance be connected via a bus. Some or all of the components of the apparatus 700 may for instance be combined into one or more modules.

The following embodiments shall also be considered to be disclosed:

Embodiment 1

A first method performed and/or controlled by at least one first apparatus, the method comprising:
receiving a paging information from a mobile communication network;
based on the received paging information, determining whether at least one pre-configured resource of a mobile communication network is to be utilized for responding to the paging information; and
based on the determining, initiating at least one transmission via at least one of a random access procedure or on the at least one pre-configured resource.

Embodiment 2

The method according to embodiment 1, wherein the determining whether at least one pre-configured resource of a mobile communication network is to be utilized for responding to the paging information is based, at least in part, on at least one of whether the apparatus has a valid timing advance, whether the apparatus has at least one valid pre-configured resource, or whether the apparatus has received an indication that the at least one pre-configured resource is to be utilized for responding to the paging information.

Embodiment 3

The method according to any of the preceding embodiments, wherein the indication that the at least one pre-configured resource is to be utilized for responding to the paging information is at least one of a SIB, System Information Block, message, a short message, a paging message, a RRC message, another dedicated message, or the indication is included in the paging information.

Embodiment 4

The method according to any of the preceding embodiments, wherein the paging information comprises an indication to resume at least one suspended pre-configured resource for Mobile Terminated, MT, access.

Embodiment 5

The method according to embodiment 4, wherein, if the response to the paging information is on or is to be transmitted on the at least one pre-configured resource, the random access procedure is avoided.

Embodiment 6

The method according to any of the preceding embodiments, further comprising:
obtaining at least resource information indicative of one or more pre-configured resources to be utilized for the response to the paging information.

Embodiment 7

The method according to any of the preceding embodiments, wherein the at least one preconfigured resource is a Physical Uplink Shared Channel, PUSCH, resource.

Embodiment 8

The method according to any of the preceding embodiments, wherein the transmission is at least one of a Physical, PHY, message, Medium Access Control, MAC, message, or a Radio Resource Control, RRC, message.

Embodiment 9

The method according to any of the preceding embodiments, wherein the at least one pre-configured resource is configured with broadcast and/or dedicated signaling.

Embodiment 10

The method according to any of the preceding embodiments, wherein the at least one first apparatus is or is part of a mobile device and/or an Internet-of-Things, IoT device.

Embodiment 11

An apparatus configured to perform and/or control or comprising respective means for performing and/or controlling the method of any of the embodiments 1 to 10.

Embodiment 12

An apparatus comprising at least one processor and at least one memory including computer program code, the at least one memory and the computer program code configured to, with the at least one processor, cause an apparatus at least to perform and/or control the method of any of the embodiments 1 to 10.

Embodiment 13

A tangible computer-readable medium storing computer program code, the computer program code when executed by a processor causing an apparatus to perform and/or control:
receiving a paging information from a mobile communication network;
based on the received paging information, determining whether at least one pre-configured resource of a mobile communication network is to be utilized for responding to the paging information; and
based on the determining, initiating at least one transmission via at least one of a random access procedure or on the at least one pre-configured resource.

Embodiment 14

A second method performed and/or controlled by at least one second apparatus, the method comprising:
providing paging information at least indicative of at least one pre-configured resource of a mobile communication network is to be utilized for responding to the paging information;
responsive to the provided paging information, obtaining (e.g. receiving) at least one transmission via at least one of a random access procedure or on the at least one pre-configured resource.

Embodiment 15

The method according to embodiment 14, wherein a random access preamble is obtained to initiate the transmission.

Embodiment 16

The method according to embodiment 14 or embodiment 15, further comprising:
providing at least resource information indicative of one or more pre-configured resources to be utilized for a response to the paging information on the one or more pre-configured resources; wherein the response is received on at least one of the one or more pre-configured resources.

Embodiment 17

The method according to any of the embodiments 14 to 16, further comprising:
resuming at least one suspended pre-configured resource.

Embodiment 18

The method according to any of the embodiments 14 to 17, wherein the at least one preconfigured resource is a Physical Uplink Shared Channel, PUSCH, resource.

Embodiment 19

The method according to any of the embodiment 14 to 18, wherein the transmission is at least one of a Physical, PHY, message, Medium Access Control, MAC, message, or a Radio Resource Control, RRC, message.

Embodiment 20

The method according to any of the embodiments 14 to 19, wherein the at least one pre-configured resource is configured with broadcast and/or dedicated signaling.

Embodiment 21

The method according to any of the embodiments 14 to 20, wherein an indication that the at least one pre-configured resource is to be utilized for responding to the paging information is at least one of a SIB, System Information Block, message, a short message, a paging message, a RRC message, another dedicated message, or the indication is included in the paging information.

Embodiment 22

The method according to any of the embodiments 14 to 21, wherein the apparatus is or is part of a base station of the mobile communication network.

Embodiment 23

An apparatus configured to perform and/or control or comprising respective means for performing and/or controlling the method of any of the embodiments 14 to 22.

Embodiment 24

An apparatus comprising at least one processor and at least one memory including computer program code, the at least one memory and the computer program code configured to, with the at least one processor, cause an apparatus at least to perform and/or control the method of any of the embodiments 14 to 22.

Embodiment 25

A tangible computer-readable medium storing computer program code, the computer program code when executed by a processor causing an apparatus to perform and/or control:
   providing paging information at least indicative of at least one pre-configured resource of a mobile communication network is to be utilized for responding to the paging information;
   responsive to the provided paging information, obtaining (e.g. receiving) at least one transmission via at least one of a random access procedure or on the at least one pre-configured resource.

Embodiment 26

A system, comprising:
   at least one first apparatus according to embodiment 11 or embodiment 12; and
   at least one second apparatus according to embodiment 23 or embodiment 24.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. An apparatus comprising at least one processor and at least one memory including computer program code, wherein the apparatus is or is part of a mobile device and an Internet-of-Things (IoT) device, and wherein the at least one memory and the computer program code configured to, with the at least one processor, cause the apparatus to at least perform:

receiving a paging information from a mobile communication network, wherein the paging information comprises a first indication to resume at least one suspended pre-configured resource for Mobile Terminated (MT) access;

based on the received paging information, determining whether at least one pre-configured resource of a mobile communication network is to be utilized for responding to the paging information, wherein the determining is based, at least in part, on whether the apparatus has a valid timing advance, whether the apparatus has at least one valid pre-configured resource, and whether the apparatus has received a second indication that the at least one pre-configured resource is to be utilized for responding to the paging information, wherein the second indication is a System Information Block (SIB) message, a short message, a paging message, and a Radio Resource Control (RRC) message, and is included in the paging information;

based on the determining, initiating at least one transmission via at least one of a random access procedure or on the at least one pre-configured resource, wherein, if a response to the paging information is on the at least one pre-configured resource, the random access procedure is avoided; and obtaining at least resource information indicative of one or more pre-configured resources to be utilized for the response to the paging information.

\* \* \* \* \*